United States Patent [19]

Garner et al.

[11] Patent Number: 5,759,500
[45] Date of Patent: Jun. 2, 1998

[54] FLUID REACTOR WITH CATALYST ON FLOATING TUBESHEET

[75] Inventors: John Byron Garner, Newark, Del.; James Olden Hester, Victoria, Tex.; Geoffry Wallar Smith, Elkton, Md.

[73] Assignee: E. I. du Pont de Nemours and Company, Wilmington, Del.

[21] Appl. No.: 586,415

[22] Filed: Jan. 16, 1996

[51] Int. Cl.⁶ .................................................... B01J 8/00
[52] U.S. Cl. .......................... 422/201; 422/221; 423/239.1
[58] Field of Search .................................. 422/198, 201, 422/221; 423/239.1, 351

[56] References Cited

U.S. PATENT DOCUMENTS

| | | | |
|---|---|---|---|
| 3,442,626 | 5/1969 | Browne | 23/288 |
| 4,127,389 | 11/1978 | Hackemesser et al. | 422/221 |
| 4,940,567 | 7/1990 | Ohlmeyer et al. | 423/239.1 |
| 4,976,928 | 12/1990 | Föster et al. | 422/148 |
| 5,236,671 | 8/1993 | Grotz | 422/148 |
| 5,314,673 | 5/1994 | Anseth et al. | 423/239.1 |
| 5,364,929 | 11/1994 | Dee et al. | 528/491 |
| 5,366,708 | 11/1994 | Matros et al. | 422/198 |

FOREIGN PATENT DOCUMENTS

| | | | |
|---|---|---|---|
| 2 645 941 | 4/1989 | France | F16L 41/00 |
| 35 36 958 C1 | 12/1986 | Germany | B01D 53/36 |
| 39 15 416 A1 | 11/1990 | Germany | B01D 53/36 |

OTHER PUBLICATIONS

John Wiley, Heat Transfer, *Amer. Inst. of Chem. Engrs.*, 327–332, 1950.

*Primary Examiner*—Ivars Cintins

[57] ABSTRACT

A fluid-reactor, heat exchange device and method of reacting a fluid in the device. The device embodies a bundle of heat-exchange tubes mounted internally of an elongated reactor shell to a stationary tubesheet attached to the reactor shell near one end of the shell. The heat-exchange tubes are also mounted to a floating tubesheet which is located near the other end of the shell. Attached to the floating tubesheet is a catalyst basket which when the device is in operation will contain catalyst. The catalyst is supported in the basket, and the fluid to be reacted will enter the shell near the point of attachment to the stationary tubesheet, where it will contact the heat exchange tubes. The fluid will flow along the outside of the tubes and into the catalyst basket where it will contact the catalyst and react. The fluid will then pass into the heat exchange tubes and finally be removed from the device near the end of the reactor where it was introduced.

11 Claims, 8 Drawing Sheets

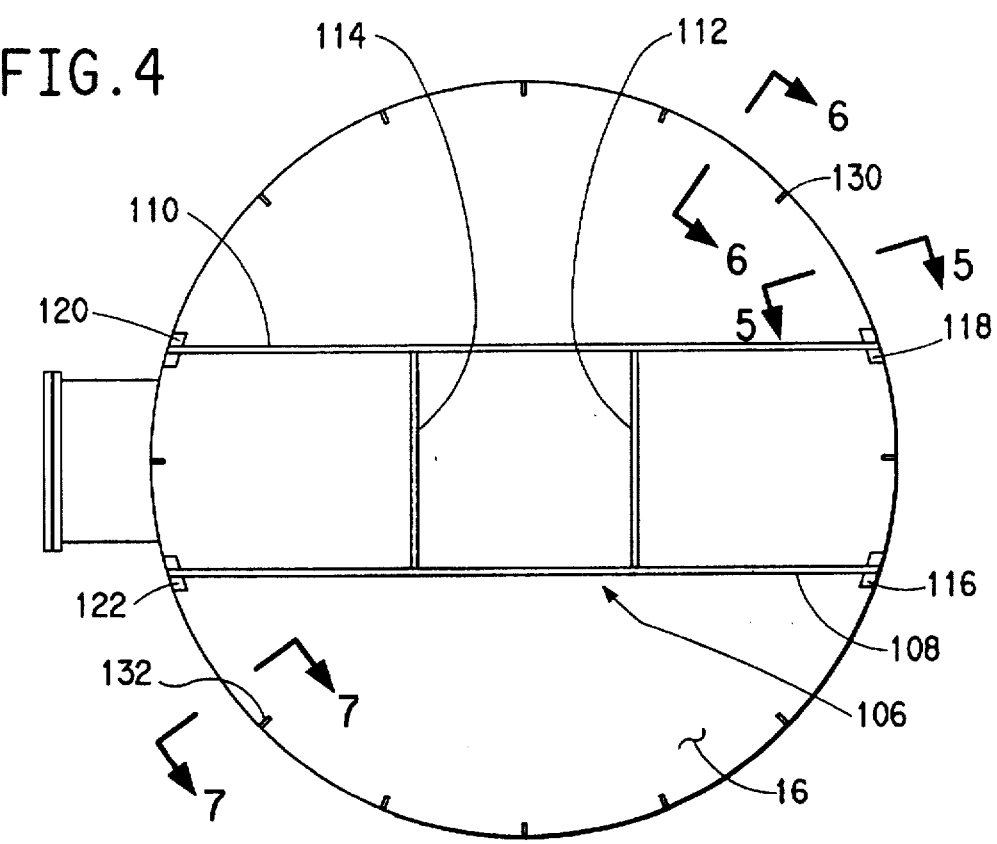
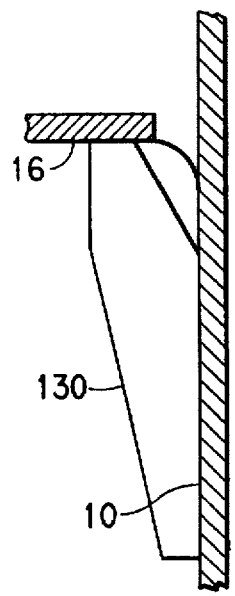
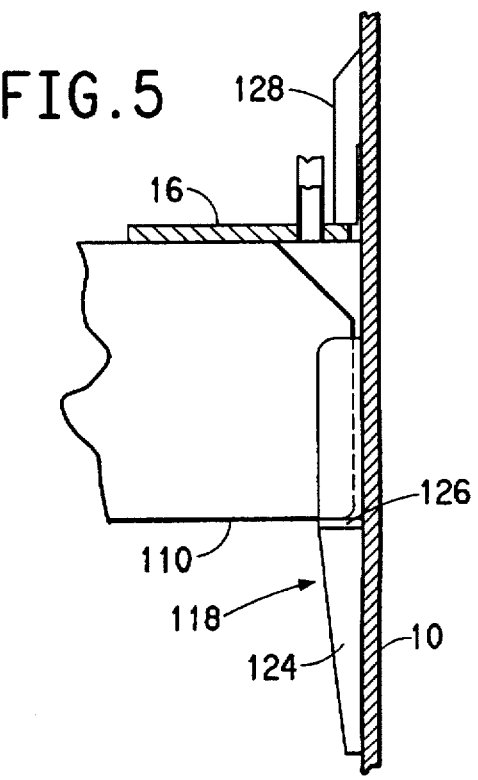

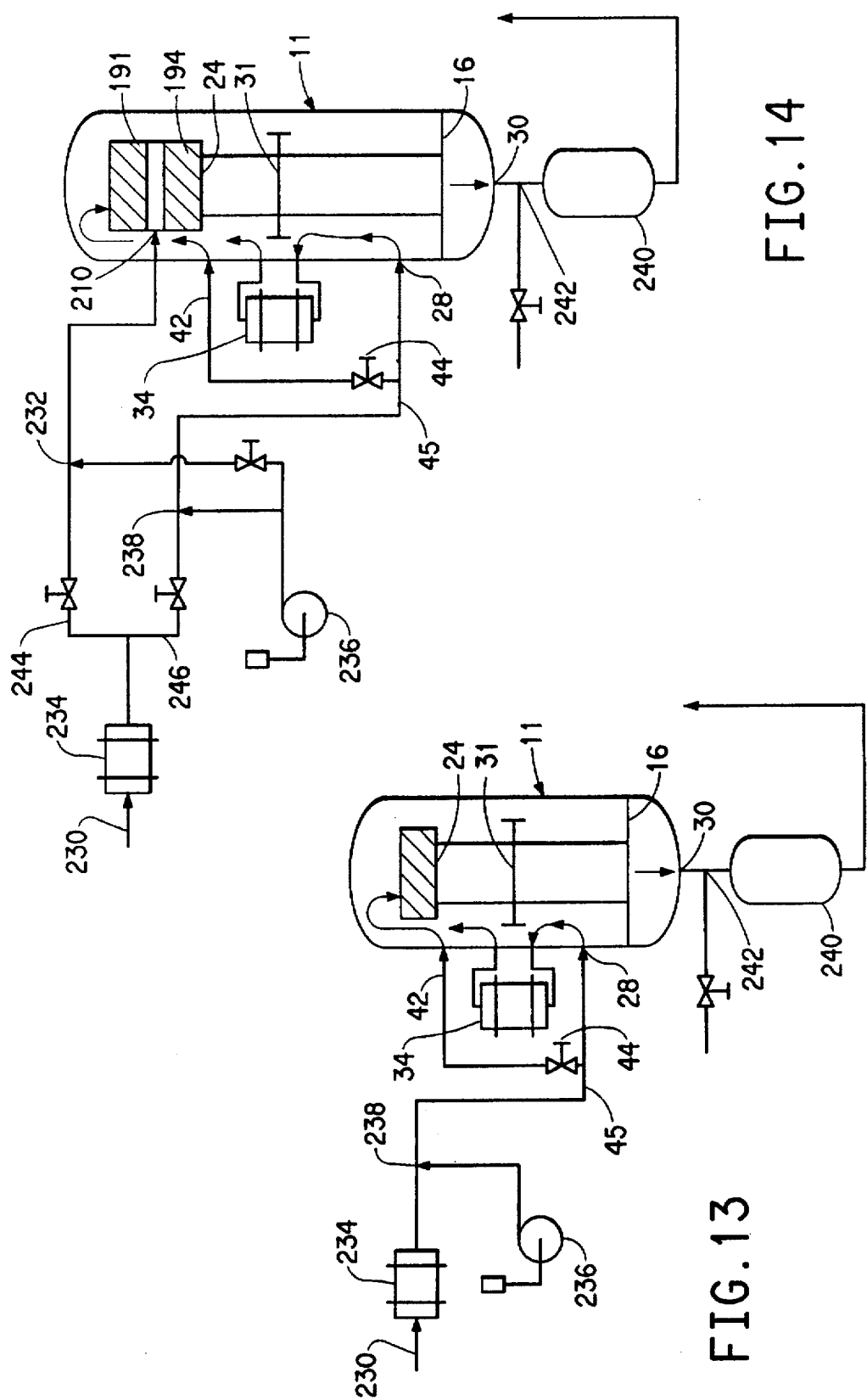

5,759,500

FLUID REACTOR WITH CATALYST ON FLOATING TUBESHEET

BACKGROUND OF THE INVENTION

This invention relates to shell and tube heat exchangers combined with exothermic catalytic gas reactors, and is particularly concerned with such an exchanger having a floating tubesheet at one end. Shell and tube heat exchangers are widely used in chemical plants, petroleum refineries, steam plants, and similar installations. Typically, such an exchanger includes a shell having inlet and outlet ports, an elongated bundle of tubes positioned within the shell, and transverse baffles for directing the fluid back and forth across the tubes. The tubes are supported by tubesheets, one of which is normally stationary by attaching it to the internal surface of the shell, and the other of which may be either stationary or "floating" to accommodate changes in tube length due to thermal expansion. The floating tubesheet is free to move axially relative to the shell which may expand and contract axially a different amount relative to the tubes. The baffles are supported on the stationary tubesheet by tierods and spacers and are thereby positioned along the length of the tubes. In a single pass exchanger, fluid is introduced into one end of the shell, makes a single pass through the shell crossing all the tubes, and is withdrawn from the shell at the opposite end.

The fluid in the tube (tube side fluid) and fluid between external surface of the tube and the internal shell wall (shell side fluid) are typically kept separate from one another by the tubesheets which are positively sealed to the shell with a fixed seal at the stationary tubesheet and positively sealed to the shell with a sliding seal at the floating tubesheet. Alternatively, the two tubesheets may be fixed to the shell, and the shell wall may contain a positively sealed expansion joint to permit thermal growth and shrinkage. These positive seals must substantially prevent all leakage. In small heat exchangers of two to three foot diameters operating at modest temperatures of 300° to 400° C., such exchangers are successfully used. However, at large diameters greater than five feet, and high temperatures exceeding 500° C., there are significant problems with high localized stresses, seal deformation, and premature failure. In large sizes and high temperatures, packed seals and expansion joints are expensive to manufacture and difficult to maintain. Such high temperatures and large sizes are often encountered in high throughput chemical processes where catalysts are used within the heat exchanger vessel to accelerate reactions.

In any case, when conventional heat exchange technology is used where seals are involved with tubesheets and there is a need to transfer the shell side fluid to the tube side, there are additional costs to provide external loops of piping out of the shell, around the tubesheet seal, and back into the shell. This adds to pressure losses and temperature losses particularly when the fluid is at its hottest in the process. This reduces the efficiency of the unit.

U.S. Pat. No. 4,976,928 to Foster et al. and U.S. Pat. No. 3,442,626 to Browne describe devices for performing exothermic catalytic gas reactions for the synthesis of ammonia under high pressures. The devices include catalyst containers and tubular heat exchangers in an inner shell enclosed by an outer shell. In the Foster device, the heat exchanger tube bundles pass through the center of two separate catalyst containers. A packing seal must be used to seal around an upper tubesheet. In the Browne device, the tube bundle passes throughout two separate catalyst chambers so the tubes are in direct contact with the catalyst which exposes the tubes to thermal and chemical extremes. Both devices are complex structures to fabricate and the problems of differential thermal expansion radially and axially between the tubesheets, tube bundles and shell are not adequately addressed for catalyst systems that operate at very high temperatures. There are additional problems supporting the very hot catalyst beds in the vicinity of sliding seals and supporting the beds where they can be easily accessible for replacing spent catalyst material.

There is a need for a simple, reliable, exothermic catalytic fluid reactor incorporating a high temperature heat exchanger for low pressure applications that accommodates differential thermal expansion and does not require positive sliding seal devices. There is a need for a device for performing exothermic catalytic gas reactions that can be built on a very large scale to handle large quantities of gas and catalyst. There is a need for a simplified process for handling gas flow through a reactor that accommodates large flow rates without tortuous flow paths and high pressure drops that require complex, bulky, expensive reactor structures.

SUMMARY OF THE INVENTION

The present invention is a fluid reactor, heat exchange device comprising:

(a) an elongated shell having a first end and second end;

(b) a bundle of tubes positioned within the shell and attached to and extending through a stationary tubesheet, said stationary tubesheet being attached to the internal surface of the elongated shell near said first end, said bundle of tubes being attached to and extending through a floating tubesheet, which is located near the second end of the elongated shell; the tubes of said bundle of tubes having bores that extend the longitudinal length of the tubes;

(c) a basket for containing a catalyst mounted to the floating tubesheet on the side closest to the second end of the elongated shell; said basket and floating tubesheet being spaced from the internal surface of the shell;

(d) means to support a catalyst in the basket and allow fluid to pass through the catalyst and into the bores of the tubes of the bundle of tubes;

(e) means to introduce a feed fluid into the elongated shell near the first end of the elongated shell;

(f) means to withdraw a reacted fluid from the bore of the tubes of the bundle of tubes near the first end of the elongated shell.

The device of the present invention may further comprise means at the second end of the elongated shell for introducing feed fluid into the elongated shell.

The device of the present invention may further comprise means intermediate the first and second end of the elongated shell for withdrawing feed fluid from the shell, and reintroducing the feed fluid to the shell, and means to heat the withdrawn feed fluid before reintroducing the fluid to the shell.

The present invention is also a method of reacting a feed fluid in a fluid-reactor, heat exchange device which comprises:

(a) introducing a feed fluid to the interior of an elongated shell having a first end and second end, near said first end;

(b) passing said feed fluid in contact with the outer surface of a bundle of tubes attached to and extending through a stationary tubesheet, said stationary tubesheet being attached to the elongated shell near said first end, said bundle of tubes being attached to and extending through a floating tubesheet which is located near the second end of the elongated shell; the tubes of said bundle of tubes having bores that extend the longitudinal length of the tubes;

(c) passing the feed fluid through a basket containing a catalyst and in contact with said catalyst, said basket being mounted to the floating tubesheet on the side closest to the second end of the elongated shell;

(d) reacting the feed fluid with the catalyst to change the chemical composition of the feed fluid and produce hot reacted fluid;

(e) passing the reacted fluid through the bores of the tubes of the bundle of tubes, thereby transferring heat to the feed fluid on the outer surface of the tubes;

(f) withdrawing the reacted fluid from the bore of the tubes of the bundle of tubes near the first end of the elongated shell.

BRIEF DESCRIPTION OF THE FIGURES

FIG. 4 is view 4—4 from FIG. 1.

FIG. 5 is an enlarged view 5—5 rotated 90° down from FIG. 4 showing details of the support for the stationary tubesheet.

FIG. 6 is an enlarged view 6—6 rotated 90° down from FIG. 4 showing details to the bottom stop support for the stationary tubesheet.

FIG. 13 is a schematic diagram of a process using a single catalyst device.

FIG. 14 is a schematic diagram of a process using a multiple catalyst device.

DETAILED DESCRIPTION

Figure 1:
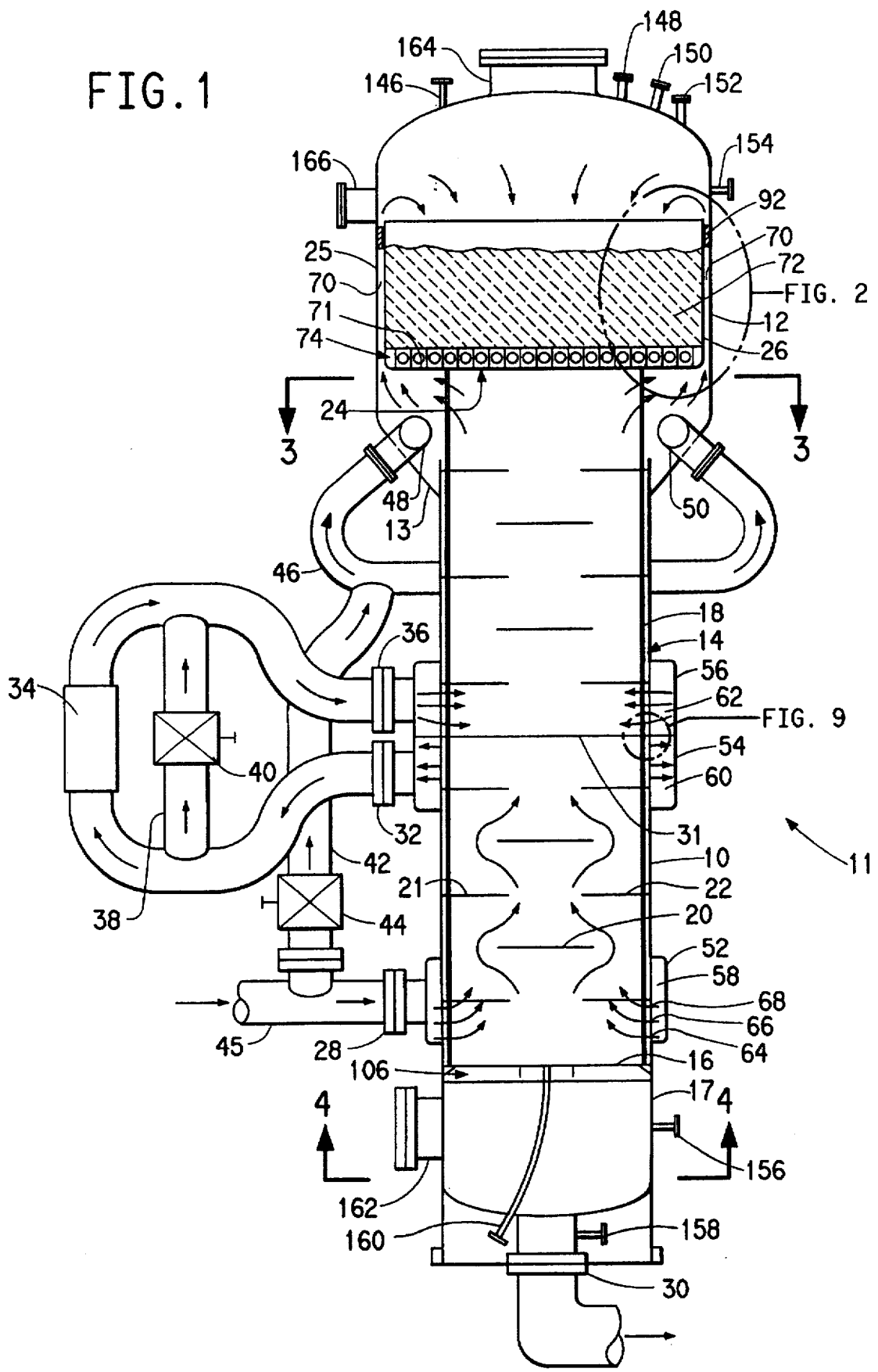
FIG. 1 is a side-section view of a heat exchanger of the invention.

A gas reactor, heat exchanger device 11 is shown in FIG. 1 for performing an exothermic catalytic gas reaction and comprises a low pressure shell 10 including an enlarged shell head 12 with tapering portion 13; a tube bundle assembly 14, comprising a stationary tubesheet 16 at a first end 17 of shell 10, a plurality of tubes such as 18, baffles such as 20, 21, and 22, and a floating tubesheet 24 at a second end 25 of shell 10; a catalyst basket 26; a feed fluid inlet port 28 to the shell-side of the tube bundle at the stationary tubesheet end; and a reacted fluid outlet port 30 at the tube-side of the tube bundle at the stationary tubesheet end of the device. Between the horizontal baffles, there may occasionally be a vertical baffle (not shown) to prevent fluid resonance vibrations in the tube bundle. In addition, the device includes a blocking baffle 31 to block feed fluid flow along the tube bundle longitudinal axis; port 32 for withdrawing the feed fluid and directing it to a fluid startup heater 34; a port 36 for reintroducing the feed fluid to the shell-side of the tube bundle 14; a shunt conduit 38 with a valve 40 for providing an alternate path for the feed fluid around the heater 34; a bypass conduit 42 off feed conduit 45, and a control valve 44 in conduit 42 for bypassing a portion of the feed gas around the tube bundle 14; a distribution manifold 46 and a pair of distributors 48 and 50 for introducing the bypassed feed fluid to the shell-side of the tube bundle at the floating tubesheet end of the device. To provide for even distribution of flow of feed fluid to and from the shell, bustles 52, 54, and 56 are provided to form annular chambers 58, 60 and 62 respectively around the shell 10. The shell has perforations at each bustle, such as perforations 64, 66, and 68 associated with bustle 52, that are circumferentially distributed around the shell 10 for passage of feed fluid through the shell. There is an annular passage 70 between the inner wall of the enlarged shell head 12 and the outer wall of the catalyst basket 26 for passage of the feed fluid from the shell-side of the tube bundle past the floating tubesheet 24 to the tube-side of the bundle. The catalyst basket 26 is attached to the open face side 71 of the tubesheet 24 which also acts as the base of the basket. The basket contains the catalyst material 72 and means 74 to support the catalyst above the side 71 of floating tubesheet 24 so that reacted fluid that has passed through the catalyst bed can be introduced to the tube-side at the open bores of the tubes 18 at tubesheet 24. There may be a plurality of standoff ribs, such as rib 92, attached to the inner wall of shell 12 at spaced circumferential intervals to insure the basket remains spaced from the shell to form the annular passage 70.

Figure 2:
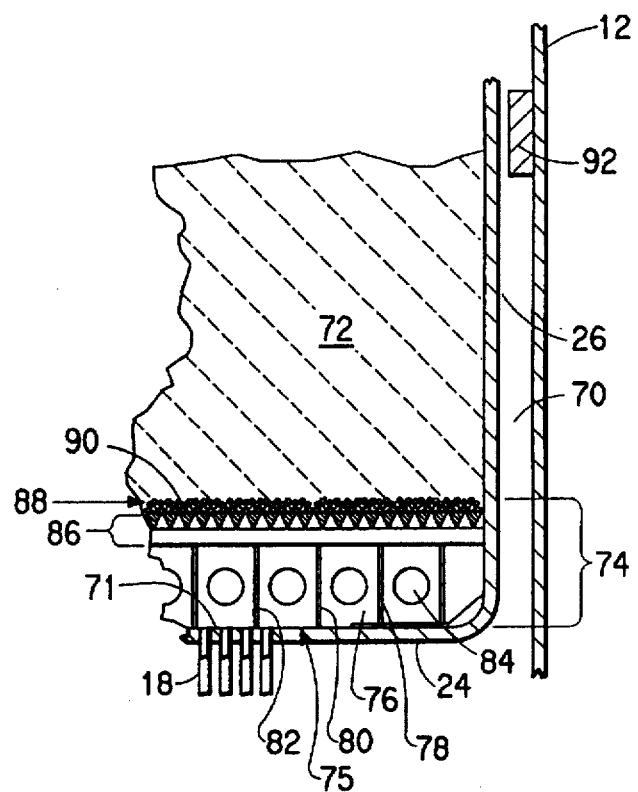
FIG. 2 is an enlarged portion 2—2 of FIG. 1 showing details of the floating tubesheet and catalyst basket.

FIG. 2 shows additional details of the catalyst support means 74. On top of the open face side 71 of the floating tubesheet 24 is a rectangular "honeycomb" structure 75 of interlocking slotted plates, such as plate 76 and intersecting plates such as plates 78, 80, and 82. Each plate has large apertures, such as aperture 84 in plate 76, for fluid communication throughout the structure 75. Placed on top of structure 75 is a screen grid 86 made of welded together intersecting bars commonly known as a "Johnson* (reg TM) screen" made by the Johnson Division of the Universal Oil Products Co. of St. Paul, Minn. On top of the screen grid 86 is a layer 88 of ceramic balls, such as ball 90. The catalyst bed 72 comprises a plurality of catalyst pellets that are placed on top of the layer 88 of ceramic balls. A wire mesh may be used instead of balls between the catalyst pellets and screen grid. The catalyst support means 74 provides structural support for the catalyst bed 72, and provides a foraminous layer that permits flow of reacted fluid that has passed through the catalyst bed to flow vertically and laterally to the open ends of the tubes 18 in floating tubesheet 24. The support means 74 should permit free flow of fluid to the open bores of tubes 18, and it should obstruct flow of catalyst pellets and particles to the bores.

Figure 3:
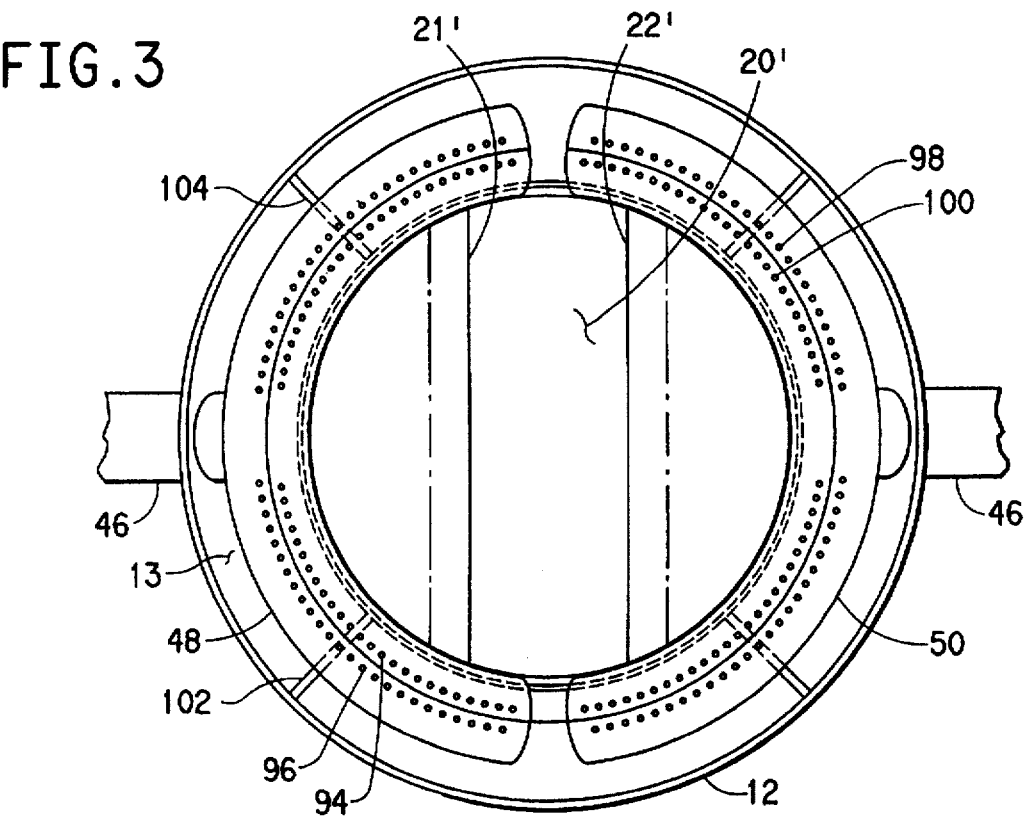
FIG. 3 is view 3—3 from FIG. 1.

FIG. 3 shows the distributors 48 and 50 for introducing bypassed feed fluid to the shell-side of the tube bundle at the floating tubesheet end of the device. The distributors are semicircular closed-end tubular conduits that have rows of holes, such as holes 94 and 96 in distributor 48 and holes 98 and 100 in distributor 50, along their length to pass the bypassed feed fluid from the distributor to the shell-side. The bypassed fluid joins the shell-side fluid coming from tube bundle assembly 14 in shell 10 and passes through annual passage 70 and enters basket 26. Distributor 48 is supported by brackets 102 and 104 attached to the tapering portion 13 of enlarged head 12, and is supported where the manifold 46 passes through portion 13. Distributor 50 is likewise supported on the opposite side of the device. The end section of tubes 18 have been omitted in the view for clarity; they would be passing through baffles 20', 21', and 22'.

The stationary tubesheet 16 must be supported firmly in the axial direction of the shell 10 and yet be allowed to thermally expand radially relative to the shell, since the tubesheet 16 is expected to be much hotter than the wall of shell 10 adjacent the tubesheet 16. The tubesheet 16, however, must be sealed to the shell wall. FIG. 1 and FIGS. 4–7 show details of the stationary tubesheet support system. A beam structure 106 takes the axial loads on the stationary tubesheet which includes the weight of the tubes 18, tubesheets 16 and 24, baffles such as 20, 21, 22, and their support structure (not shown), the catalyst basket 26 with all its contents; and the load of the pressure drop across the stationary tubesheet. Referring to FIG. 4, looking up at the bottom of the stationary tubesheet 16 (the tubes bores are omitted for clarity) the beam structure 106 comprises two beams 108 and 110 that span across the shell 10, and two stiffeners 112 and 114 that span between beams 108 and 110. The beams are supported at the shell 10 by brackets 116, 118, 120, and 122. The view 5—5 in FIG. 4 has been rotated 90 degrees down in FIG. 5. The bracket 118 comprises a sideplate, such as sideplate 124, on both sides of beam 110 and a shelf 126 on which the beam rests and on which it is free to move toward and away from shell 10 due to differential thermal expansion. The bracket 118 is fastened only to the shell 10 such as by welding. A plurality of top stops, such as stop 128, are welded only to shell 10 at intervals around the circumference of shell 10 to prevent "upward" movement of tubesheet 16 axially during assembly and shipping. Referring to FIG. 6, also rotated as was FIG. 5, there are a plurality of bottom stops, such as stops 130 and 132 (FIG. 4), that are welded only to shell 10 at intervals around the circumference of shell 10 to prevent "downward" movement of tubesheet 16 axially during assembly. The bottom stops also provide support of tubesheet 16 around the periphery distant from beams 108 and 110 when the device is in operation.

Figure 7:
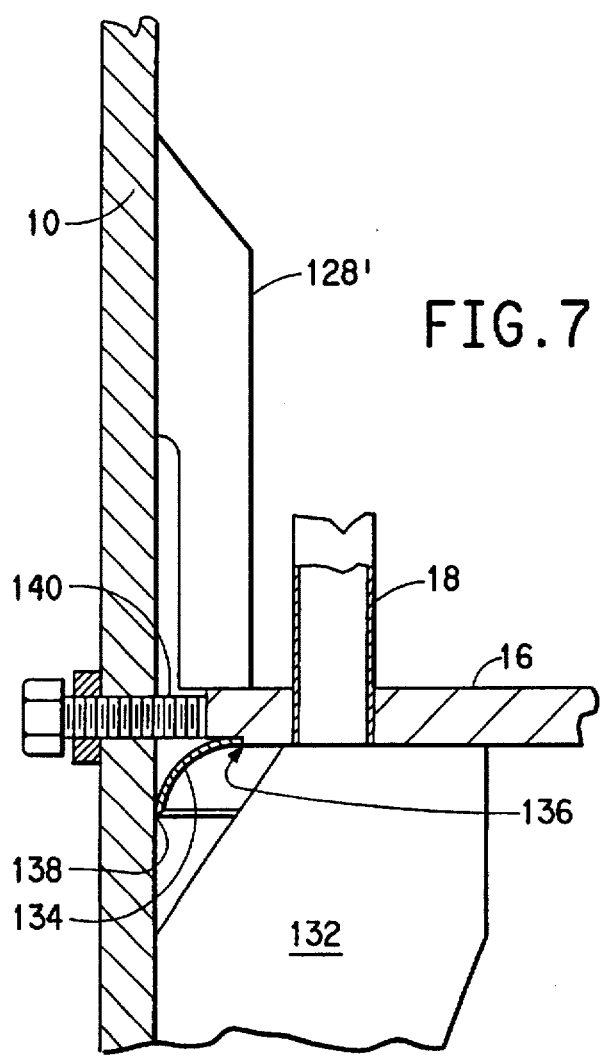
FIG. 7 is an enlarged view 7—7 rotated 90° from FIG. 4 showing details for assembling and sealing the stationary tubesheet to the shell.

FIG. 7 (view 7—7 from FIG. 4 rotated 90 degrees down) shows an enlarged view of details of the support and sealing of tubesheet 16 to the shell 10. The tubesheet 16 is sealed to shell 10 by welding a thin curved annular ring 134 to a shoulder 136 cut in the bottom surface of the periphery of tubesheet 16, and welding the opposite end of the curved ring to shell 10 at position 138. This thin curved ring will flex to permit radial movement of tubesheet 16 toward and away from shell 10 due to differential thermal expansion that takes place at startup and shutdown of the device. During operation, the thermal conditions remain essentially constant so back and forth movement of tubesheet 16 and repeated flexing of ring 134 is not occurring. Bolt 140 is shown threaded through shell 10 and engaging tubesheet 16 as it would do only during assembly and shipping of the device. Bolt 140 is one of a plurality of bolts that engages the periphery of tubesheet 16. During assembly of tubesheet 16 in shell 10, it is first necessary to center and axially position the tubesheet prior to welding the ring 134 to both the tubesheet and shell. The accomplish this, shell 10 may be inclined horizontally and only the top stops, such as stop 128' are welded in place in shell 10. Tubesheet 16 is first positioned against the top stops, and then bolts, such as bolt 140, are threaded through shell 10 so the tips engage the outer periphery of tubesheet 16. The plurality of bolts are adjusted until tubesheet 16 is centered in shell 10 and is tightly held in place axially. Ring 134 (which may comprise discrete segments that are to be welded together) can then be welded first to tubesheet 16 and then to shell 10. When the device is ready for operation, bolts 140 would be removed and replaced with shorter bolts that are used only to plug the threaded holes in shell 10. The head of the short bolts would be welded to shell 10 to positively seal the threaded holes.

Figure 8:
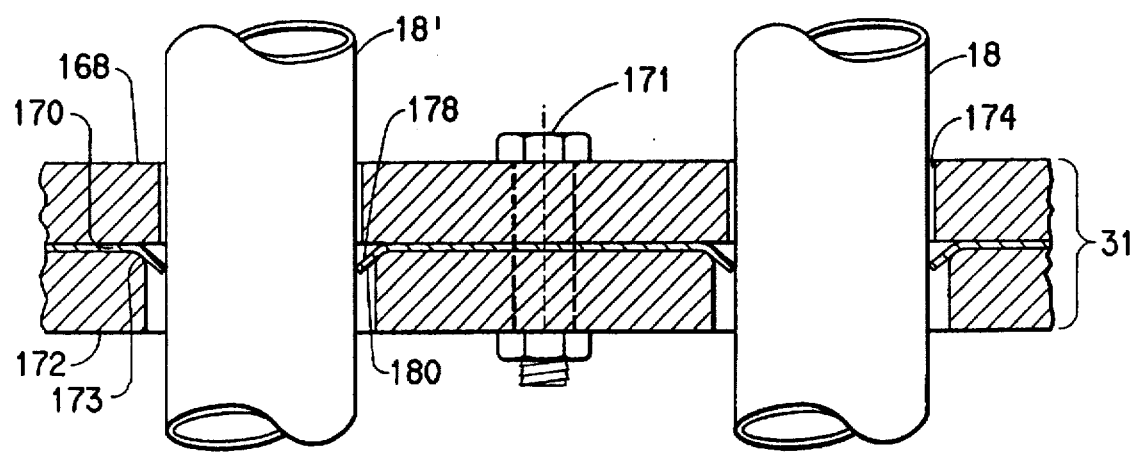
FIG. 8 is a section view through a portion of the blocking baffle.

Blocking baffle 31 must essentially block flow of feed gas traveling along the shell side of the tubes and along the wall of the shell so the bulk of the feed gas is diverted through perforations in the shell at bustle 54. Some small amount of leakage is acceptable so a positive seal is not required, but special measures are taken in the design of this baffle to limit the leakage. FIG. 8 shows a portion of a side section view through blocking baffle 31. It consists of a laminated structure which includes a top plate 168, a flexible sheet 170, and a bottom plate 172 that are held tightly together by fasteners, such as bolt and nut assembly 171. The top plate, bottom plate and flexible plate have a plurality of holes through them that align with the tubes, such as 18 and 18' in the tube bundle assembly 14 (FIG. 1). The holes in the top plate 168 are a close clearance fit with the tubes 18 and 18'; the holes in the bottom plate 172 are a loose fit with the tubes 18 and 18' and are radiused or chamfered at 173 to conform to the shape of the flexible sheet holes; the holes in the flexible sheet 170 are a slight interference fit with the tubes 18 and 18'. The holes in the flexible sheet are flared or contoured or conformed to increase their diameter and create a radiused entry surface 178 for entry of the tubes 18 and 18'. This structure provides a baffle plate that is structurally rigid to resist insertion forces of the tubes and withstand pressure and temperature forces in use, and form a loose seal with the tubes to permit sliding insertion and limit fluid leakage through the baffle. In use, the higher pressure is applied to bottom plate 172 that, when acting on the back side 180 of the radiused entry surface, may tend to improve the sealing effectiveness of flexible sheet 170 around tubes 18 and 18'.

Since the holes in flexible sheet 170 fit tightly around tubes 18 and 18', they determine the position of the tubes as they pass through the baffle plate 31. The holes in the flexible sheet must be accurately positioned to align with the desired array of the tubes that are to be welded to the tubesheets at the ends of the bundle and to align with the holes in plates 168 and 172. The holes in flexible sheet 170 can be accurately positioned by the following procedure:

bolt together the upper and lower plates and flexible sheet into a sandwich structure before any holes are formed;

drill holes through the sandwich structure at the size of the holes for the flexible sheet;

disassemble the sandwich structure;

enlarge the holes in the top plate separately;

enlarge the holes in the bottom plate separately and radius or chamfer the edge as at 173;

reassemble only the bottom plate and the flexible sheet;

contour form the flexible sheet holes by pressing the material of the flexible sheet against the radiused or chamfered surface of the bottom plate holes;

disassemble the flexible sheet from the bottom plate;

separately assemble the top plate, flexible sheet and bottom plate on the tie rods for the baffle plates (optional step for ease of assembly);

bolt the sandwich structure of top and bottom plate and flexible sheet together.

Figure 9:
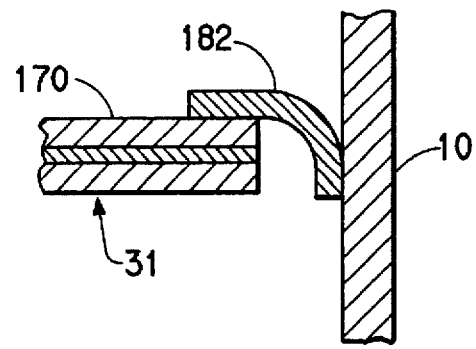
FIG. 9 is a section view showing the edge of blocking baffle sealing against the shell.

After the above procedures, the tubes can be assembled with the tubesheets and baffle plates. To further limit leakage around the baffle plate, a seal is applied to baffle plate 31 after assembly in the shell 10 and before the tubes are in place. This seal is shown on FIG. 9 as a quarter round tube segment or ring 182 welded around the periphery of baffle 31, specifically to the top plate 170. It is placed in the clearance between baffle plate 31 and shell 10 and is placed against the inside of shell 10 with the concave side of ring 182 facing the higher pressure side of baffle plate 31.

Since the device of the invention is suitable for a very large scale, the assembly procedure for a large heavy structure may require special consideration. The following describes major steps and is one way to assemble the device, although other ways are possible:

assemble the shell 10 without the bottom end and only the tapering portion 13 of the enlarged head 12 in place and with the shell 10 in a horizontal orientation;

weld in the top stops 128;

position the tubesheet 16 against the top stops and engage bolts 140;

bolt the baffles to tubesheet 16 as in a conventional heat exchanger;

insert precut tubes 18 through the baffles and through tubesheet 16;

weld distributors 48 and 50 in place;

position the floating tubesheet 24 without the sidewalls of the basket 26 in place;

push the tubes 18 back through tubesheet 16 until they pass through tubesheet 24 and are flush with the bottom of tubesheet 16 and the top of tubesheet 24;

weld a few selected tubes to tubesheet 16 and 24;

weld all tubes to tubesheet 16;

weld on sealing ring 134 to tubesheet 16 and shell 10;

weld in bottom stops;

install support beam structure 106 against the bottom of tubesheet 16;

install beam brackets 116-122 and weld them in place;

weld all tubes to tubesheet 24;

weld on basket 26 to tubesheet 24;

weld on bottom of shell 10;

weld on enlarged head 12;

after completion, ship the device horizontally with bolts 140 still in place;

raise the device so shell 10 is vertically oriented;

remove bolts 140, replace with short bolts, and weld the heads of the short bolts to shell 10.

To monitor the operation of the device, there are numerous thermal and pressure sensors installed through ports in the shell 10 and head 12. There is at least one port 146 in head 12 for sensing temperature of fluid in the top of the device. There is at least one port 148 in head 12 for sensing temperature within the center of the catalyst bed 72. There is at least one port 150 in head 12 for sensing temperature at the top of the catalyst bed. There is at least one port 152 in head 12 for sensing temperature at the edge of the catalyst bed. There is at least one port 154 in head 12 for sensing pressure of fluid in the top of the device. There is at least one port 156 in the bottom of shell 10 for sensing pressure of fluid in the bottom of the device. There is at least one port 158 in outlet port 30 for sensing temperature of fluid in the bottom of the device. There is at least one port 160 in shell 10 for sensing temperature of fluid just below the catalyst bed 72. The port 160 comprises a tube that extends from the shell 10 to a special sensor tube (not shown) in tubesheet 16. The sensor tube extends to and through tubesheet 24 the same as the tubes 18. A long temperature probe can be inserted from the bottom of the device through port 160 and passed through the two tubesheets to measure the fluid temperature at the catalyst support means 74. Port 162 in the shell 10 at the bottom of the device is an inspection port. Port 164 in head 12 is an inspection port. Port 166 in head 12 is a catalyst fill port.

The device may be useful for cleaning up a waste gas stream, such as one containing $N_2O$, where it is desired to convert the gas to nitrogen and oxygen as is described on U.S. Pat. No. 5,314,673, hereby incorporated herein by reference. In the process described in the '673 patent, the $N_2O$ is contacted with a catalyst consisting essentially of nickel oxide and cobalt oxide on a zirconia substrate. A schematic diagram of a flowstream using the process is shown in FIG. 13. 100% of an offgas flowstream 230 is passed through a heat exchanger 234 where heat may be added to assist in process control. The concentration of $N_2O$ in the stream 230 may be 50–60%, which is too high and would cause overheating if passed through the catalyst. A compressor 236 introduces air into the stream at 238 to reduce the concentration of $N_2O$ to about 10–15%, which is directed to the gas reactor, heat exchanger device 11, through conduit 45 to port 28, and through valve 44 and bypass conduit 42. The gas is treated in the device 11, and the treated gas passes from the device at outlet port 30 to a catalytic abatement device 240 and to a stack. Materials to assist in the abatement reaction may be added at 242. The operation of device 11 will be further described referring to FIG. 1.

At startup, valve 44 is closed so all the gas enters shell 10 through port 28. The gas flows upward on the shell side of the tube bundle 14 around baffles, such as 20, 21, and 22 until the gas encounters blocking baffle 31. The gas is then diverted out of the shell to bustle 54 and through port 32 and to startup heater 34 which is turned on. At this time, valve 40 in shunt conduit 38 is closed so all the gas goes through the heater 34 and to port 36. The heated gas reenters shell 10 at port 36 and continues upward on the shell side of tube bundle 14. When the heated gas encounters tubesheet 24, it moves radially outward to annular passage 70 and upward past the basket 26 and then flows downward through the catalyst. The gas flows out through the catalyst support means 74, through tubesheet 24 and into tubes 18, through tubesheet 16, and out through port 30.

It is significant that the inlet gas flows over a portion of the length of the tubes 18 before it enters the heater 34. In this way, a smaller capacity, low cost heater can be used that "boot-straps" itself to raise the temperature of the inlet gas. This is particularly suitable for a heater that is only used infrequently to start the process. Part of the energy applied by the heater, plus whatever heat the catalyst startup reaction can provide, is transferred to the feed gas entering the heater. In this way, a heater that can only raise the heater inlet gas about 300° F. can progressively raise the feed gas temperature over 1200° F.

The hot gas provided by the heater "ignites" the catalyst and starts the catalytic reaction. When the catalyst is "lit", it is no longer necessary to supply heat to the gas via heater 34 since the gas is heated by the catalytic reaction itself. The hot reacted gas flows through the tube-side and heats the feed gas flowing over the shell-side. In fact, when the catalyst is fresh, it heats the reacted gas so hot, that it is desired not to heat much of the feed gas at all. At this point shortly after startup, the heater 34 is turned off, valve 40 is opened to provide a low back-pressure shunt around the heater, and valve 44 is opened to direct a portion of the feed gas around the tube bundle so it is not heated at all. The "cool" bypassed gas entering the head 12 through distributors 48 and 50 is mixed with hot gas coming off the shell side of the tube bundle to provide a feed gas mixture to the catalyst bed that will regulate the temperature of the catalyst to the desired temperature. As the catalyst gradually deteriorates over a long period of operation and becomes less efficient, the temperature of the catalytic reaction begins to decrease. This can be sensed by thermocouples in the various sensor ports and the valve 44 can be partially closed so that more of the gas going to the catalyst bed comes from the shell-side of the tube bundle where it has been heated by the reaction gas flowing through the tube-side of the bundle. This will keep the catalyst bed operating at the desired temperature. The variety of temperature monitors in the shell permits accurate feedback on the catalyst bed and the gas temperatures for use in controlling the process. Since changes in the process take place slowly, manual reading of the monitors and adjusting the valves for control is acceptable, although automated control is possible. This control is accomplished by monitoring the temperature of the catalyst through thermocouple ports 148, 150, and 152 (singly or together); monitoring the temperature of the reacted gas fluid between the catalyst bed and the tubeside of the floating tubesheet through thermocouple port 160; and controlling the amount of feed fluid introduced to the shell side of the tube bundle at the floating tubesheet end by regulating the flow through valve 44. Typically, as the catalyst ages and its temperature drops and the reacted gas temperature drops, the valve 44 would be regulated to decrease the amount of cool feed gas fed to the floating tubesheet end.

Figure 10:
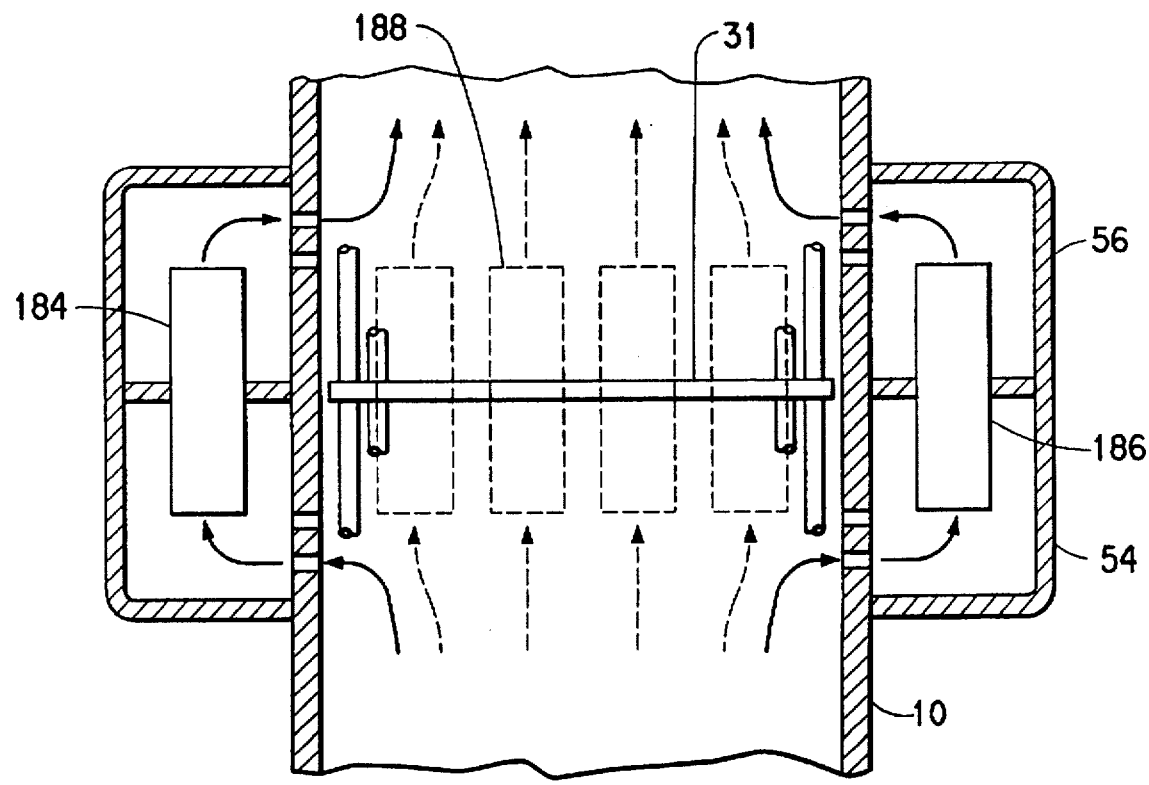
FIG. 10 is a section view of an alternate embodiment of the start-up heater at the bustles intermediate the ends of the shell.

FIG. 10 shows an alternate embodiment of the startup heater 34. In this embodiment, the single startup heater 34 is replaced with a plurality of smaller heaters, such as 184, 186 and 188 that are placed in the bustles 54 and 56 around the periphery of the shell. In this way, no external piping is required and several small heaters could be less expensive than a very large single heater that requires special mounting and thermal stress considerations. The small multiple heaters may also be easier to control and maintain.

The design for the gas reactor heat exchanger does not require positive sealing sliding seals, and the high temperatures in the catalyst basket are shielded from the shell by an annular layer of feed gas in passage 70. The hot tube bundle 14 is able to expand axially without constraint from the cooler shell since they are not connected except at the one seal 134 at the stationary tubesheet 16. The hot tubesheet 16 can expand radially independently of the cooler shell 10 by deformation of the flexible seal 134. The low pressure drop across the stationary tubesheet 16 and across the floating tubesheet 24 permits the use of lightweight materials for them. The low pressure drop from the inlet 28 to the outlet 30 of the device permits low pressure operation without a thick shell 10 and head 12. The temperature sensors and bypass gas system permit close control of the catalyst temperature so uniform treatment of the feed fluid is possible and catalyst life is not compromised.

In use as a waste gas reactor that operates at a low pressure and high temperature, the bottom half of the shell 10 may be made out of 304 stainless steel to withstand temperatures of about 900° F. and the hotter top half out of Incoloy 800H to withstand temperatures of about 1400° F.; the head 12 would also be made out of Incoloy. The basket 26 would be made out of Incoloy coated on the inside with a protective ceramic coating where the catalyst contacts it. The floating tubesheet 24 may be made out of Incoloy and the stationary tubesheet 16 out of stainless steel. The tubes 18 may be made out of Incoloy 800. The design is economical for small or large structures such as an 8 foot diameter shell 10 and a 12 foot diameter basket 26 that may hold as much as 14,000 pounds of catalyst. The structure may be operated at shell pressures of 20–40 psig. Higher pressures are also possible with this design by proper consideration of the stresses involved. As a waste gas reactor, there may be no salable product produced, so the cost of the apparatus must be kept low. The use of a low pressure system permits the use of low cost materials of construction, low assembly costs, and low operating costs. The low pressure requires a larger volume system for the same throughput as a high pressure system, so the design must not introduce complex components that are expensive to build and operate in a large size.

Although the invention has been described with reference to the embodiment of FIG. 1, it is within the scope of the invention to vary the preheating and bypassing systems described. For instance, the shunt 38 and valve 40 may be part of the bypass conduit 42 and the heater 34 may be in parallel fluid communication with shunt 38 and valve 40. This would eliminate the need for blocking baffle 31, bustles 54 and 56, and ports 32 and 36. In this case, however, the heater may need to provide a lot more heat to light off the catalyst since the inlet gas to the heater is not preheated as it is in FIG. 1. This may require a larger, more costly heater. Other means of supporting the catalyst are also possible as well as different stationary tubesheet support means, baffle systems, bypass gas distributors, and the like.

Figure 11:
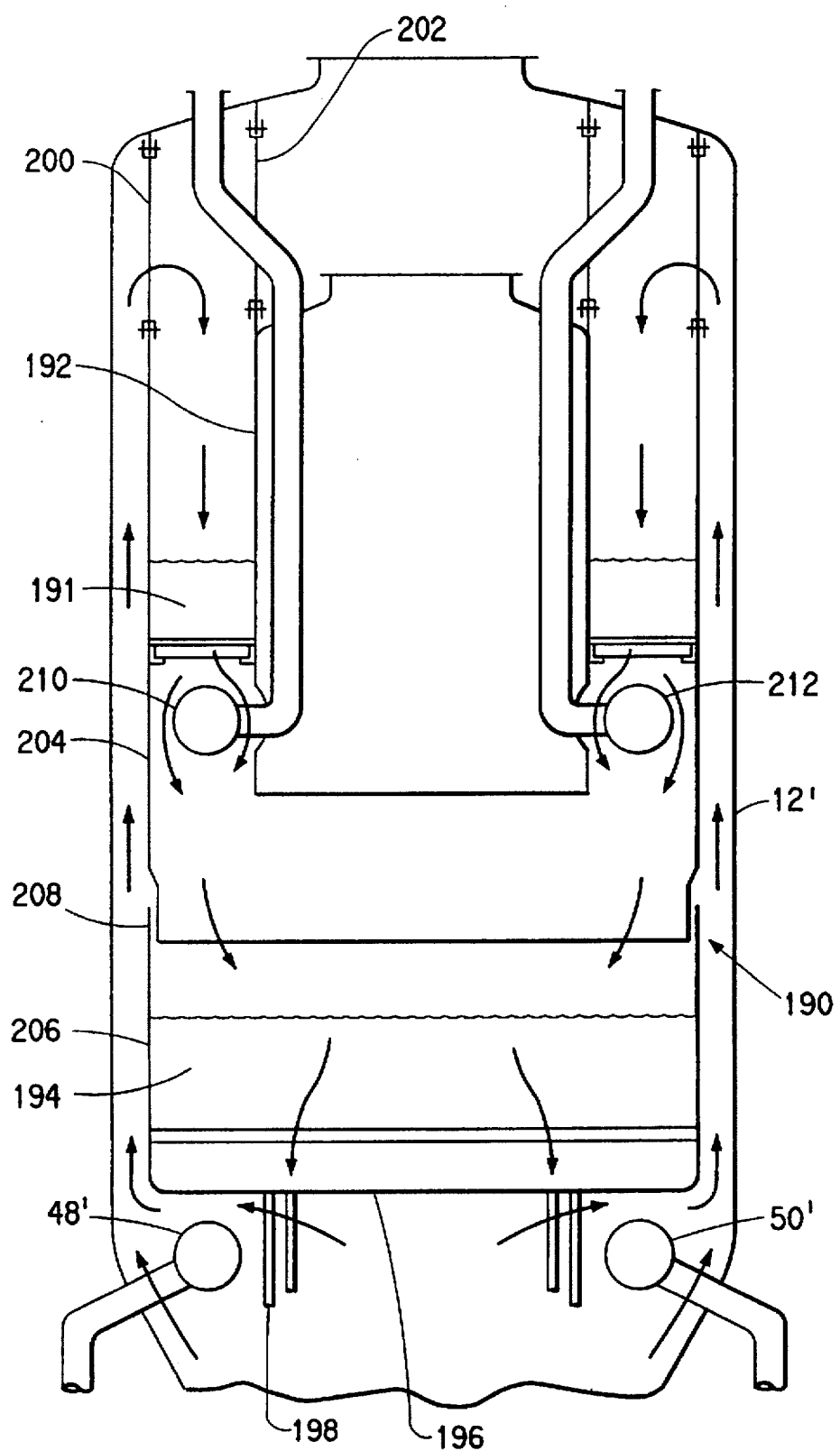
FIG. 11 is an alternate embodiment of the floating basket that includes two catalyst beds.

FIG. 11 shows an alternate embodiment of the catalyst basket 26 on FIG. 1 in which the alternate basket assembly 190 includes two catalyst beds instead of one. Catalyst bed 191 is an annular bed around access port 192 that permits access to circular catalyst bed 194 that is directly over tubesheet 196 that is supported by bundle 198. The catalyst bed 191 and access port 192 are shown supported from shell head 12' by hangers such as 200 and 202. This hanging portion 204 overlaps the bottom portion 206 of the basket assembly at a seal 208 that permits thermal movement between portion 204 and portion 208; the seal may be a clearance seal or a sliding seal that permits some leakage. Any fluid leaking around bed 191 past the seal 208 would still mix with the fluid flow and pass through bed 194, so such leakage would have little or no effect on the efficient operation of the device. The hanging design permits the weight of the upper portion 204 to be removed from the tubesheet 196; alternatively, tubesheet 196 could be designed to handle the weight so the upper portion of the basket assembly could be connected to the lower portion and the hangers and seal 208 omitted. Distributors 48' and 50' provide cool fluid for regulating the temperature of catalyst bed 191, and distributors 210 and 212 provide cool fluid for regulating the temperature of catalyst bed 194. In use, the fluid to be treated first passes downward through bed 191 and then downward through bed 194 before entering the bores of the tube bundle. This sequential passage of the gas may permit higher flow rates since the gas will be exposed to more catalyst surface area than in the configuration of basket 26 in FIG. 1. Alternatively, the fluid may be exposed to two separate catalysts in the two separate beds which may be beneficial for some treatments.

The two catalyst bed system is also useful in a process to beneficially reduce the amount of fluid required to dilute the feed stream compared to the process discussed referring to FIG. 13. FIG. 14 shows a two catalyst bed system having a modified flowstream to that shown in FIG. 13. In the modified flowstream, the feed stream would be divided into two streams and the treated stream from the first catalyst may be used to dilute part of the feed stream to the second catalyst. For instance, the stream 230 would be divided coming out of heat exchanger 234 into a first stream 244, that may represent 60% of the stream, and a second stream 246 representing the remaining 40%. Stream 246 would be diluted with stream 238 from compressor 236 and would flow to the device 11 as described referring to FIGS. 13 and 1. Stream 244 would also be diluted slightly for control purposes via stream 232. The diluted stream 246 entering port 28 would flow through first catalyst bed 191 where an ingredient of the stream would be treated. This treated stream would then mix with stream 244 introduced through distributors, such as distributor 210 (FIGS. 14 and 11), which would dilute the stream 244 before it passed through second catalyst 194. Using the treated stream from first catalyst 191 as a diluent saves on the amount of diluent needed from compressor 236. This will result in smaller compressor requirements and lower operating costs for the same feed gas stream. Although only two catalysts are illustrated, three or more catalyst beds could be used with the treated stream from each catalyst being used to dilute other streams. This reduction in the amount of diluent required reduces the total volume being treated and, therefore, the throughput requirements of the heat exchanger tube bundle assembly 14. A smaller, lower cost bundle can be used which can result in a shorter length bundle or a smaller diameter one. The overall size of the device 11 and the flow piping to and from the device can be correspondingly reduced. This use of a plurality of catalyst beds significantly reduces the cost of manufacture and cost of operation of device 11 for a given stream compared to a single catalyst bed system. The additional cost of a second bed and its sensors and controls is more than offset by these cost reductions.

Figure 12:
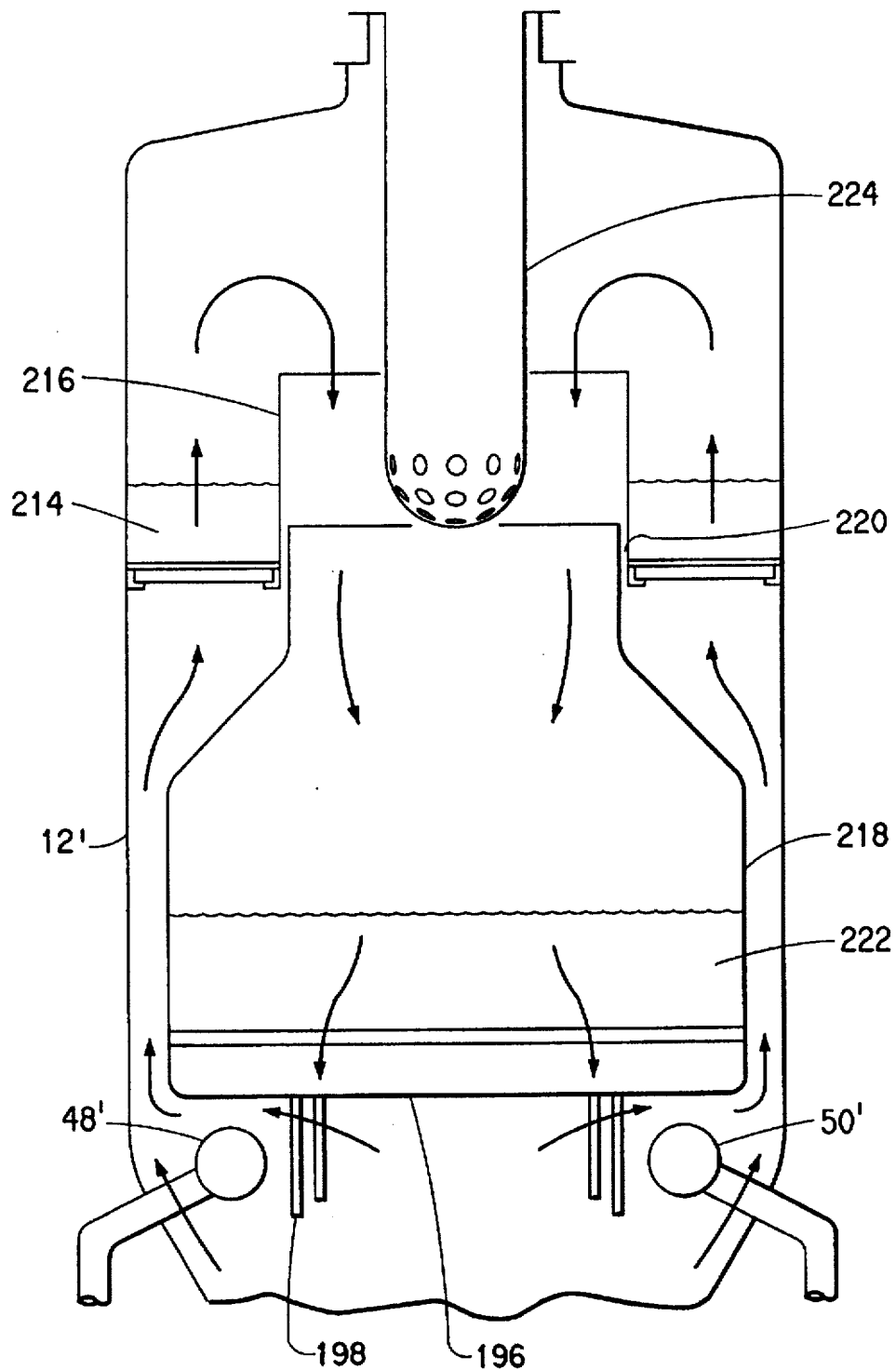
FIG. 12 is an alternate embodiment of the floating basket that includes another variation for two catalyst beds.

FIG. 12 shows a variation of FIG. 11 and another embodiment of the catalyst basket wherein a second catalyst bed 214 is contained in a basket 216 rigidly attached to shell head 121. Basket 216 overlaps the floating basket 218 at a seal 220 that permits thermal movement between basket 216 and basket 218; the seal may be a clearance seal or a sliding seal that permits some leakage. Any fluid leaking around bed 214 through the seal 220 would still mix with the fluid flow and pass through bed 222 in basket 218 so such leakage would have little or no effect on the efficient operation of the device. Distributors 48' and 50' provide cool fluid for regulating the temperature of catalyst bed 214, and distributor 224 provides cool fluid for regulating the temperature of catalyst bed 222. In use, the fluid to be treated first passes upward through bed 214 and then downward through bed 222 before entering the bores of the tube bundle 198. This upward passage of fluid through bed 214 must have the flow rate controlled so as to avoid lifting and floating the catalyst particles in the bed. This sequential passage of the gas may permit higher flow rates since the gas will be exposed to more catalyst surface area than in the configuration of basket 26 in FIG. 1. Alternatively, the fluid may be exposed to two separate catalysts in the two separate beds which may be beneficial for some treatments. Additionally, this variation may also enjoy the benefits of reduced requirements for a diluent gas as discussed referring to FIG. 14.

What is claimed is:

1. A fluid reactor, heat exchange device comprising:
   (a) an elongated shell having a first end and a second end;
   (b) a bundle of tubes positioned within the shell and attached to and extending through a stationary tubesheet, said stationary tubesheet being attached to the internal surface of the elongated shell at said first end, said bundle of tubes being attached to and extending through a floating tubesheet which is located at the second end of the elongated shell; the tubes of said bundle of tubes having bores that extend the longitudinal length of the tubes;
   (c) a basket for containing a catalyst mounted to the floating tubesheet on the side closest to the second end of the elongated shell, said basket and floating tubesheet being spaced from the internal surface of the shell;
   (d) a catalyst in the basket;
   (e) means to support the catalyst in the basket and allow fluid to pass through the catalyst and into the bores of the tubes of the bundle of tubes;
   (f) means to introduce a feed fluid into the elongated shell at the first end of the elongated shell;
   (g) means to withdraw a reacted fluid from the bore of the tubes of the bundle of tubes at the first end of the elongated shell.

2. The device of claim 1 further comprising means at the second end of the elongated shell for introducing feed fluid into the elongated shell.

3. The device of claim 2 further comprising means intermediate the first and second end of the elongated shell for withdrawing feed fluid from the shell, and means intermediate the first and second ends of the elongated shell for reintroducing the withdrawn feed fluid to the shell, and means to heat the withdrawn feed fluid before reintroducing the feed fluid to the shell.

4. The device of claim 3, further comprising:
   a blocking baffle interposed in the shell between said means for withdrawing fluid and reintroducing fluid.

5. The device of claim 4, wherein said blocking baffle comprises a flexible sheet having a plurality of holes that contact the outer surface of the tubes, said sheet clamped between two plates that have a plurality of holes in registry with said holes in the flexible sheet and that are free of contact with said tubes.

6. The device of claim 1, which, in addition to having a basket for containing a catalyst and a means to allow fluid to pass through the catalyst, further comprises:
   another basket for containing another catalyst;
   another catalyst in said another basket; and
   means to allow fluid to pass through said another basket and said another catalyst.

7. A method of reacting a feed fluid in a fluid reactor, heat exchanger device, comprising:
   introducing a fluid feed at the first end of an elongated shell having a first end and a second end,
   passing said feed fluid in contact with the outer surfaces of a plurality of tubes in a bundle, said tubes being attached to and extending through a stationary tubesheet sealed to the internal surface of said shell at said first end of the shell and attached to a floating tubesheet at said second end of the shell, the tubes in said bundle having bores extending the length of the tubes;
   passing the feed through a catalyst supported on the face of the floating tubesheet;
   reacting the feed fluid with the catalyst to change the chemical composition of the feed and produce a hot reacted fluid;

passing the hot reacted fluid through the bores of the tube bundle to transfer heat to the feed fluid on the outer surface of the tubes in the bundle and cool the reacted fluid;

withdrawing the cooled reacted fluid from the tube bores and the shell at said first end of the shell.

8. The method of claim 7 further including the step of introducing another source of feed fluid adjacent said second end of the shell to thereby mix said another source of feed fluid with said feed fluid before it contacts said catalyst.

9. The method of claim 7 which, in addition to passing the feed fluid through a catalyst supported on the face of the floating tubesheet, further comprises the step of passing said feed fluid through a second catalyst.

10. The method of claim 7 in which prior to introducing the fluid feed at the first end of the elongated shell, the concentration of an ingredient in the fluid feed is adjusted.

11. The method of claim 10 in which a second fluid feed stream is introduced at the second end of the elongated shell and is combined with the hot reacted fluid, and the stream formed by the combination is reacted with the catalyst, and then passing that stream through the bores of the tube bundle.

* * * * *